March 31, 1970 R. HOLZHAEUSER 3,504,330
ELECTRICAL CONNECTOR
Filed July 18, 1968 2 Sheets-Sheet 1

United States Patent Office 3,504,330

Patented Mar. 31, 1970

3,504,330

ELECTRICAL CONNECTOR

Rene Holzhaeuser, Choisy-le-Roe, France, assignor to C.I.T.-Compagnie Industrielle des Telecommunications, Paris, France Filed July 18, 1968, Ser. No. 745,762
Claims priority, application France, July 19, 1967, 114,852
Int. Cl. H01r *9/12;* H05k *7/10*
U.S. Cl. 339—176 10 Claims

ABSTRACT OF THE DISCLOSURE

An electrical connector having a socket for the reception of a plug formed with conductive tracks to which individual electrical circuits are to be completed by the connector, comprising male and female insulative bodies providing respective sets of electrical contacts which slide resiliently against one another while maintaining firm contact pressure therebetween when the two bodies are mated together.

This invention relates to electrical connectors and is more specifically concerned with a connector having a socket for the reception of a plug formed with conductive tracks to which individual electrical circuits are to be completed by the connector. Such a connector may take the form of an edge connector such as is used to complete a multiplicity of electrical circuits to individual contact tracks printed parallel to one another along one or both marginal edge portions of a printed circuit plug. The plug commonly forms an integral part of a printed circuit board.

In printed circuit technology each board may carry a number of small components such as semi-conductors, resistors, capacitors and so forth which are interconnected according to the desired circuit diagram and may also be connected to output terminals formed on the card as a set of parallel conductive tracks provided along the plug-portion of the card. The tracks and normally all of the inter-circuit connections are formed by thin planar copper strips affixed on a substrate of insulative material constituting the board. The thin copper strips may be produced by different processes which do not form part of the present invention and which are to be understood as being generically covered by the term "printed." To complete electrical circuitry to the board an edge connector is used which generally takes the form of an insulative body provided with a socket into which the printed circuit plug is fitted, and electrical terminals extending from the body for connection to external circuitry. Generally the terminals extend from contact clips mounted in respective pockets in the body and providing contact springs which protrude slightly into the socket so that they resiliently engage respective conductive tracks provided on the printed circuit plug.

The edge connector enables the electrical connections between the external circuitry and the printed circuit board to be readily broken so that the electrical circuitry represented by the board can be replaced with another board quickly and simply. In this way a doubtful or faulty printed circuit may be replaced with one known to be in perfect condition so that the faulty circuit may be checked and repaired at leisure.

Over a period of several years the conductive tracks of the printed circuit plug become worn as a result of the number of times the board may have to be plugged into and unplugged from the edge connector. Once the contact tracks get worn the circuit board has to be replaced as the tracks form an effectively non-repairable part of the board. As the cost of replacing a printed circuit board may be considerable, particularly when the board is provided on both sides with separate electrical circuitry to which connections are made from conductive tracks provided on one side of the plug in the case of one of the circuits, and on the other side of the plug in the case of the other circuit, any technique which prolongs the working life of the conductive tracks is of considerable commercial importance.

Various proposals have been tentatively put forward to prolong the life of printed circuit boards. One such proposal is to plate the conductive tracks of the plug with a layer of nickel to prolong their life. Printed circuit plugs which are separate from the board but are attached thereto have also been proposed, such plugs having conductive tracks made of a hard metal and which are connected to the circuitry of the board by welded connections or by flexible or rigid connections. It has also been proposed to complete the connections between the contact tracks of the plug and the circuitry of the board by prongs or pins which fit into tubular eyelets in the board.

These proposals are generally costly and are not always found to be satisfactory. In actual practice, the work involved in making the connections between the board circuitry and the printed circuit plug is onerous and the quality of the electrical connection established between the conductive tracks and the contact springs of the edge connector frequently deteriorates relatively quickly as there is inevitably wear when two conductive surfaces are resiliently slid over one another while maintaining between them a pressure sufficient to provide the desired operating contact pressure between the contact springs of the edge connector and the conductive tracks of the plug.

An object of the invention is the provision of an improved connector.

In accordance with the present invention an electrical connector having a socket for the reception of a plug formed with conductive tracks to which individual electrical circuits are to be completed by the connector, comprises male and female insulative bodies providing respective sets of electrical contacts which slide resiliently against one another while maintaining firm contact pressure therebetween when the two bodies are mated together, one of the bodies which has the socket formed in it being provided with electrical contact clips each having a laterally displaceable portion which provides on one side one of said contacts and on the other side a resiliently yieldable contact spring which protrudes into the socket at a position at which it can engage one of the plug tracks, the arrangement of the connector being such that the insertion of a plug into the socket of the unmated body is accomplished without establishing operating contact pressure between the contact springs and the tracks, but subsequent mating of the two bodies together displaces the clip portions towards the plug tracks so as to establish between the tracks and the contact springs the desired operating pressure while simultaneously completing circuits through the electrical contacts of the two parts.

The electrical connector of the invention suitably takes the form of a printed circuit edge connector in which case the socket extends longitudinally of said one body and is adapted to receive a linear printed circuit plug having planar conductive tracks.

Suitably each clip has its opposite ends held against lateral movement while its intermediate part forms said displaceable portion. The displaceable portion is preferably provided with oppositely bowed strips one of which provides the electrical contact on one side of the clip while the other provides the contact spring. It is preferred for the bowed strip providing the electrical contact to be longitudinally slotted to provide two separately movable electrical parts.

A convenient arrangement is to have said one body formed on one side with the socket for the reception of the plug and on the other side with a part shaped for easy insertion into a cavity in the other body when the two bodies are mated together to complete the connector. Where the connector is adapted for use with a printed circuit plug, the clips may be provided on one or both sides of said one body in order to complete electrical circuits to conductive tracks provided on one or both sides of the plug in accordance with whether the associated board is of single sided or double sided type. In either case the contact spring which engages the conductive track of the plug may be longitudinally slotted to provide separately movable parts to the contact spring and thus lessen the likelihood of an imperfect electrical contact being established. Where the body having the socket has two rows of contact clips, the other body likewise may be provided with two rows of contact members to maintain isolated circuits leading to the printed circuit board attached to the plug.

Suitably fixtures may be provided on said one body to attach it rigidly to the plug when inserted into the socket. In this way the likelihood of wear occurring between the contact springs and the conductive tracks when the body having the socket is separated from the other body is reduced. It will be appreciated that when the two bodies are separated from one another the contact pressure holding the plug in the socket is substantially reduced and therefore there is more likelihood of relative movement occurring between them causing subsequent wear of the touching surfaces of the contact springs and the conductive tracks.

Various advantages stem from the invention and its subsidiary features.

One advantage is that the contact pressure between the springs of the socketed body and the conductive tracks of the plug are applied in two stages. When the plug is being inserted into the socket, there is very little resistance to the sliding movement as the contact springs bear only lightly against the conductive tracks as the displaceable portions of the clips are able to displace bodily away from the plug. The consequent contact pressure is low and is insufficient to cause any appreciable wear on the contact tracks of the plug. However, when the two bodies are subsequently mated with one another, the contact springs are thrust with the displaceable portions of the clips towards the contact tracks of the plug so that the contact pressure is considerably increased. However it should be noted that the normal operating contact pressure established between the contact springs and the conductive tracks occurs without any sliding displacement whatever occurring between the touching surfaces of the conductive tracks and the contact springs of the clips. There is thus no risk of wear.

A second advantage of the invention is that because the connector produces insignificant wear of the conductive tracks of the plug, the tracks of the plug may be made of soft electrolytic copper which does not have to be hardened by covering it with a layer of a more wear-resistant metal. Commonly a superficial gold layer is applied over the conductive tracks of a printed circuit plug in order to ensure satisfactory electrical contact. As a result of the negligible wear to which a conductive track is subjected when mated with the connector of the invention, the gold layer may be applied very thinly indeed and only in a sufficient thickness to preserve the conductive track against eventual oxidation.

A further advantage is that the two bodies can be mated and separated from one another very rapidly and without risk of damage.

The invention will now be described in more detail, by way of example, with reference to the accompanying drawings, in which.

Figure 1:
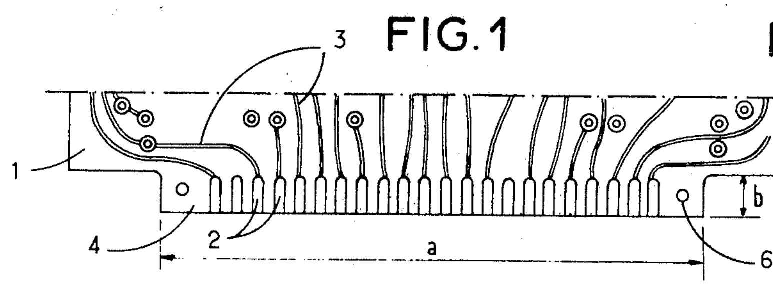
FIGURE 1 shows a plug portion of a printed circuit board.
Figure 2:
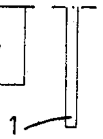
FIGURE 2 is an end view of FIGURE 1.

FIGURES 1 and 2 show the plug portion of a printed circuit board 1 having one marginal portion of reduced width and providing a linear printed circuit plug 4. The plug is provided with parallel conductive tracks 2 formed on both sides and integral with leads 3 joining the tracks to appropriate positions of circuitry (not shown) mounted on the board. The conductive tracks 2 and leads 3 are planar in form and are made by a printed circuit technique so that they are effectively coplanar with the surface of the board 1. It is customary to make the plug 4 of a printed circuit board of lesser width *a* than the width of the remainder of the board and the height *b* of the plug is normally approximately the height of the conductive tracks 2. As shown in FIGURE 2, the leading edge of the plug 4 is not provided with a chamfer. Holes 6 at opposite end areas of the plug 4 provide fixtures for fastening the printed circuit board rigidly to the socketed part of the edge connector by means of fixtures (not shown).

Figures 3, 4, 5:
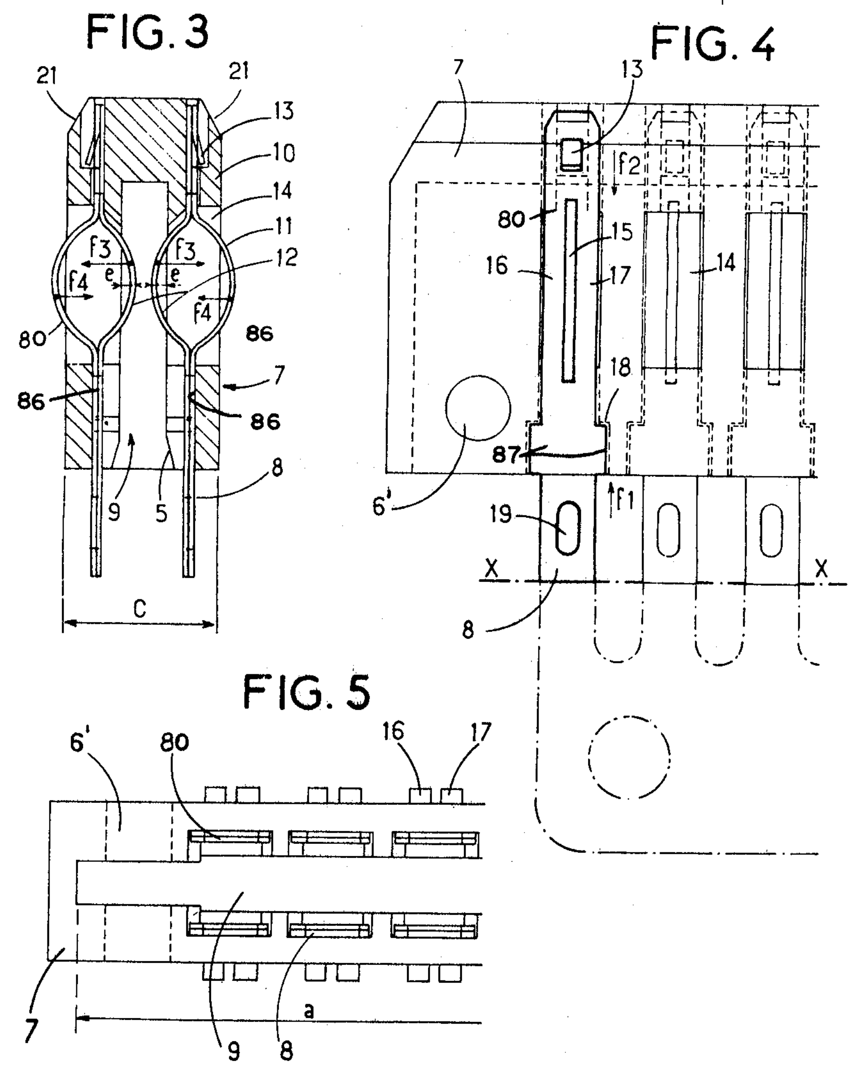
FIGURE 3 is a cross-section through a body having a plug socket and forming part of a printed circuit edge connector.
FIGURE 4 is a partial side view of the body of FIGURE 3 and is partially broken away to show, in full outline, a clip mounted in a pocket in the body.
FIGURE 5 is a plan view of FIGURE 4, the protruding portions of contact springs of the clips into the socket being omitted for the sake of clarity.

FIGURES 3, 4 and 5 show the socket part of the edge connector from which it will be seen to comprise an elongated body 7 of insulative material provided with a socket 9 having a flared mouth 5 for the reception of the plug 4 of the board 1. As shown in FIGURE 4, opposite end portions of the body 7 are provided with holes 6' which register with the holes 6 of the plug 4 when inserted into the socket 9 to enable the board and socket to be rigidly held together by means of fixtures (not shown) which are passed through the registering holes. The body 7 is provided along opposite sides of the slot 9 with projecting terminals 8, formed with apertures 19 as clearly shown in FIGURE 4, and which are made of a metal such as nickel silver, bronze or the like which is harder than the conductive tracks 2 of the printed circuit board. Such metals, being harder, are more appropriate for withstanding sliding wear.

Figure 6:
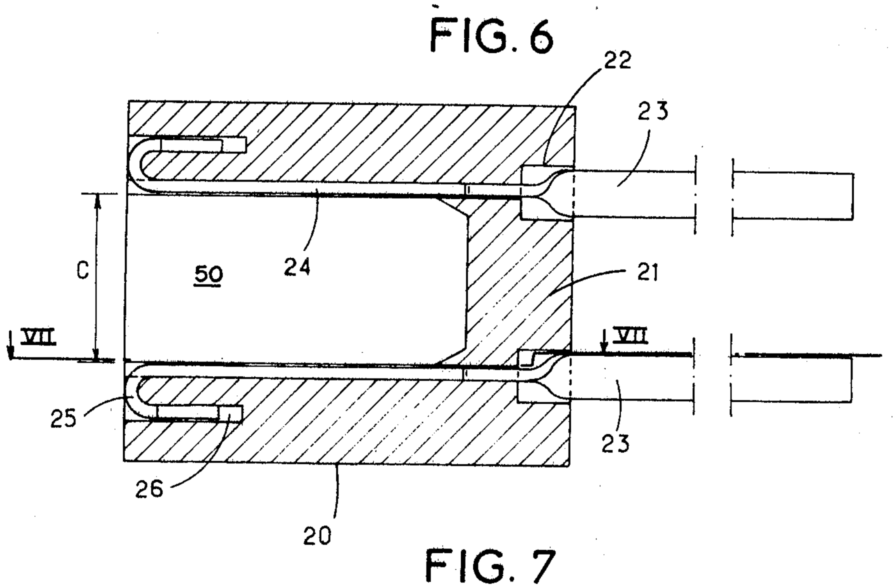
FIGURE 6 is a cross-section through a second body of the connector providing a cavity with which a spigot on the first body is to be mated.
Figure 7:
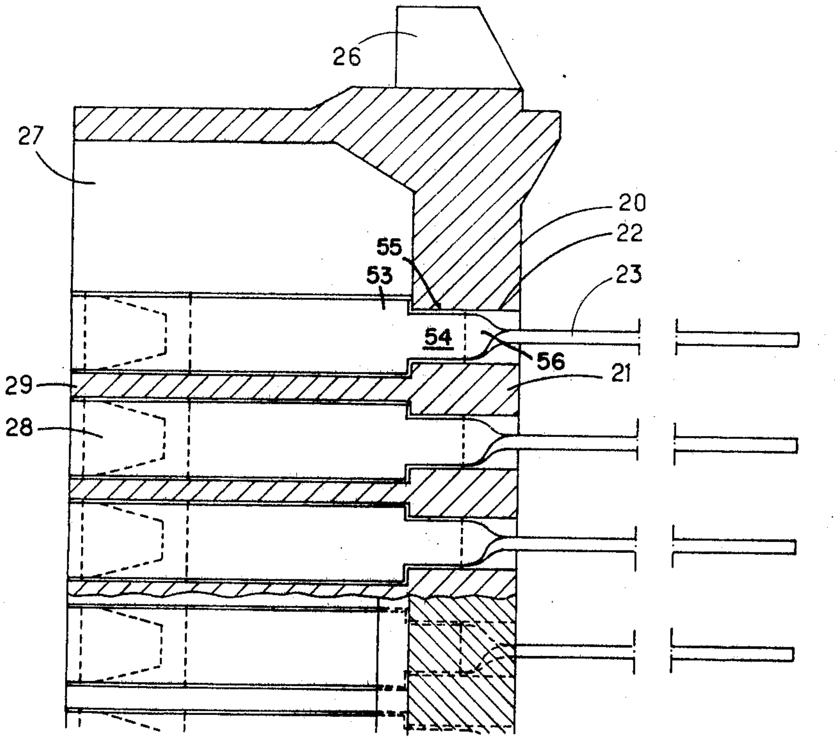
FIGURE 7 is a section through FIGURE 6 taken on the line and in the direction indicated by the arrows VII—VII in FIGURE 6.

The portion of the body 7 opposite to the mouth 5 of the socket 9 is tapered to assist mating with a cavity 50 formed in a female body shown in FIGURES 6 and 7. As clearly shown in FIGURE 3, the taper of the body 7 is provided by chamfered edges 21 which enable the body 7 to be plugged easily into the cavity.

The body 7 is moulded from a synthetic plastics material and is provided in its side walls with pockets for the reception of respective contact clips 80. The pockets pass wholly through the side walls to form windows 14 therein.

Each contact clip is composed of two metal strips 11, 12 which are united with one another, for example by welding, and have oppositely bowed portions extending away from one another and providing an intermediate portion of the clip 80. Although the oppositely bowed portions are shown as being symmetrical, this is not essential and their relative heights and curvatures may be different. Referring to FIGURE 3, it will be seen that one end portion of the clip 80 provides the terminal 8 and a portion of it lies against an inside face 86 of the body 7 so that it is constrained against movement away from the socket 9, while the other end portion of the clip 80 is provided with a tongue 13 sprung out of its plane and accommodated within a recess formed in the body 7. The floor of the recess provides an abutment surface engaged by the end edge of the tongue 13 so that movement of the clip 80 downwards, as viewed in FIGURE 3, is prevented by the tongue 13. The portion of the clip 80 forming the terminal 8 has rectangular wings 87 shown clearly in FIGURE 4 which provide shoulders for engaging abutment surfaces 18 provided inside the body 7 to prevent movement of the clip 80 in the direction of the clip shown as upwards in FIGURE 3.

The pockets in the body 7 are so arranged that one lies opposite each of the conductive tracks 2 of a plug when mated with the socket 9. As is clearly shown in FIG. 3, each pair of clips 80 on opposite sides of the socket 9 provide arched contact springs formed from the strips 12 and which protrude slightly into opposite sides of the socket 9. The other strips 11 of the clips 80 provide with their outwardly bowed portions electrical contacts which protrude outwardly beyond the side walls of the body 7. The bowed contact springs and the bowed electrical contacts may each be provided with a longitudinally extending slit dividing it into two effectively independently movable parts 16, 17 as shown in FIGURE 4 where the slit is referenced 15. The two parts 16 and 17 are able to be deformed independently of one another so that an improved quality of electrical contact is obtained.

The view of the body 7 shown in FIGURE 4 is cut away to show one of the springs 8 in full outline while the other adjacent two springs are shown in broken outline only. Although the springs 80 may be individually made, it is preferred to form one complete row of springs 80 by detaching them from a unitary assembly constructed much in the form of a comb from which the springs 80 are severed after they have been placed in their respective pockets in the body 7. The line along which severance of the clips 80 takes place is indicated at X—X and the severed portion of the comb is shown in chain-dotted outline. Severance naturally takes place after the two strips 11 and 12 of the clips have been welded together. Constructing and inserting the clips in this manner considerably shortens the time necessary for assembling the parts of the male body part 7.

FIGURE 5 is a plan view of FIGURE 4 and shows the clips 80 in position although the protruding spring arms which extend into oppoiste sides of the socket 9 from respective clips 80 have been omitted for the sake of clarity. It will be seen from FIGURE 5 that the length of the socket 9 corresponds to the length of the leading edge of the printed circuit plug, and the width of the socket 9 in the region where the conductive tracks are disposed is marginally greater than at opposite end portions where the fixture holes 6′ are provided. The holes 19 in the terminals 8 of the clips enable welded attachments to parts of the printed circuit board to be made by jumper-leads if it is desired. The holes 19 and the provision of the terminals 8 are naturally optional.

FIGURES 6 and 7 show the other or female body of the edge connector. The reference 50 denotes the cavity into which the male body 7 is fitted. The spacing between opposite sides of the cavity is such that the side walls of the body 7 are received in the cavity 50 with a snug fit.

The female body 20 is provided with parallel members providing contact strips 24 lining opposite sides of the cavity 50. One end portion of each electrical contact strip is hooked over at 25 and is received in an accommodating recess 26 provided in the end wall of the body 20 adjacent the entry to the cavity 50. At the level of the floor of the cavity 50 the strip 24 is shouldered at 53 as is clearly shown in FIGURE 7. The portion 54 of the strip 24 of reduced cross-section passes through a slot 55 which opens into a rebate 22 of approximately square cross-section and containing a twst 56 formed in the strip 24. The end portion of the strip 24 protrudes from the rebate 22 to provide an electrical contact tag or terminal 23 for connection to external circuitry. Opposite end portions of the cavity 50 are extended at 27 beyond the facing rows of strip contacts 24 to accommodate opposite end portions of the male body 7. Partitions 29 formed in opposite walls of the cavity 50 separate the strip contacts 24 from one another so that there is no risk of them inadvertently coming into contact. A lug 26, shown in FIGURE 7, is provided to enable the female body 20 to be fixed to a panel or frame. The contact strips 24 are flat when they are inserted into their respective recesses in the female body 20 and their tags or terminals 23 are passed through the slots 55 until the hooked end 25 is snugly seated in the recess 26. The root portions of the tags or terminals 23 are then gripped and twisted so that the twist 56 prevents subsequent withdrawal of the contact strips 24.

The edge connector is used as follows:

The male body 7 is withdrawn from the cavity 50 of the female body 20 and is mated with the plug 4 of the printed circuit board. As the plug is inserted into position, the conductive tracks 2 slide past the arched contact springs which bear lightly against their surface. As is clearly shown in FIGURE 3, the windows in which the intermediate portions of the clips 80 are mounted are so shaped that there is nothing to resist outward movement of the intermediate portions. In consequence the relatively light contact pressure of the contacts springs is lessened by bodily displacement of the intermediate portions of the contact clips 80 away from the plug 4. The longitudinal slot 15 formed in each of the contact springs and which divides it into two relatively flexible parts 16, 17 increases the flexibility of the contact spring which therefore offers little resistance to movement in the direction of the arrow $f_3$ in FIGURE 3. This movement is accompanied by displacement of the protruding portions of the contact springs through the distance *e*. The contact clips 80 therefore offer negligible resistance to the insertion of the plug 4, and there is insufficient contact pressure produced between the conductive tracks 2 and the contact arms of the clips to cause any appreciable wearing of the track surfaces despite them being made of relatively soft copper.

When insertion of the plug portion 4 is completed, the holes 6 and 6′ in the body 7 and the plug 4 register with one another and fixtures can be inserted through them.

The assembly of board and body 7 is then mated with the female body part 20 by insertion of the body 7 into the cavity 50. As a result of the insertion of the plug 4 into the socket 9, and the consequent outward displacement of the intermediate portions of the clips 80, the portions of the clips which protrude beyond the outer side walls of the body 7 are rather greater than is shown in FIGURE 3. As previously mentioned, the width C of the male body 7 is only marginally less than the width of the socket 50 so that during the insertion of the male body 7 into the cavity 50, the exposed arched contacts of the intermediate portions of the clips 80 are guided by the hooked ends 25 of the contact strips 24 into engagement with the flat surfaces of the strip contacts 24. In consequence, the intermediate portions of the clips 80 are forced back towards the positions shown in FIGURE 3 and the arched contact of the strip 11 is flexed resiliently inwardly in the direction of the arrow $f_4$ in FIGURE 3. The insertion of the body 7 into the body 20 is therefore accompanied by a substantial increase in contact pressure between the conductive tracks 2 of the plug 4 and the contiguous contact springs. Moreover, this pressure is maintained by the inherent resilience of the inwardly flexed arched portion of the strip 11 so that a good electrical contact accompanied by a firm operating contact pressure is maintained between the contact spring and the contiguous contact track 2, and the electrical contact contiguous with the contact strip 24 shown in FIGURE 6. This stems from the biconvex intermediate clip portion being resiliently compressed into the thickness of the wall of the body 7 defined between one side surface of the socket 9 and the adjacent outside surface of the body wall.

After the plug 4 has been inserted into the male body 7, suitable holding fixtures are inserted through the registering holes 6 to join the plug 4 rigidly to the body 7. The rigid assembly so formed may then be plugged and unplugged from the female body 20 without any wear at all occurring on the conductive surfaces of the tracks 2 of the plug 4. All of the wear is confined to the contiguous surfaces of the clips 80 and the strip contacts 24 both of which are made from hard-wearing materials well able to withstand without noticeable wear repeated plugging and unplugging the two bodies 7 and 20.

It will be noticed that the two arched portions of the strips 11 and 12 of the clips 80 come together at a point spaced from one end of the window 14, that end being the lower surface shown in FIGURE 3. This allows the deformation of the intermediate portion of the clip 80 to occur without buckling of the arched electrical contacts and contact spring when they are flexed towards one another during mating of the two bodies 7 and 20. It will thus be appreciated that the male body 7 takes over the function of the conductive tracks 2 of the plug 4 in a conventional printed circuit plug so that wear of the conductive tracks during plugging in is virtually eliminated. The fixtures which are passed through the registering holes 6 suitably take the form of hollow metal members or eyelets.

It will now be understood that the invention enables a printed circuit plug to be provided with soft copper conductive tracks which need only a thin coating of a material to prevent oxidisation as they are no longer subjected to frictional wear during plugging and unplugging of the board from the external circuitry to which it is to be attached. Plugging and unplugging of the board takes place in a simple manner so that replacement of one printed circuit board by another is readily and easily accomplished without any wear on the conductive tracks.

I claim:

1. An electrical connector formed with a socket in which may be inserted a plug provided with conductive tracks to which individual electrical circuits are to be completed by the connector, said connector comprising a female insulative body formed with a cavity, a male insulative body shaped to mate with the cavity of said female body, sets of electrical contacts mounted on said bodies at positions at which they slide resiliently against one another during mating, a plug socket formed in one of said bodies, pockets formed in said one body and extending along one side of said socket, electrical contact clips mounted in said pockets of said one body, a portion of each clip being laterally resiliently displaceable in said pocket and providing on one side one of said electrical contacts, a resiliently yieldable contact spring provided by said displaceable clip portion on the opposite side to the electrical contact and protruding into said socket at a position at which it engages one of said plug tracks when said plug is mated with said socket, said electrical contact and said contact spring of each displaceable portion projecting simultaneously from said body and into said socket, respectively, and said clip portion being resiliently displaceable away from said socket during insertion of said plug and back towards said socket during mating of said two bodies.

2. A connector as set forth in claim 1, in which said body having said cavity includes metal members providing parallel electrical contacts in said cavity and electrical attachment tags extending from the body.

3. A connector as set forth in claim 2, in which said clip comprises two strip portions lying face to face at opposite end portions of said clip and arched away from one another between said end portions to provide a biconvex intermediate portion.

4. An electrical edge connector having a parallelpiped socket for the reception of a linear printed circuit plug formed with parallel conductive tracks to which individual electrical circuits are to be completed by the connector, said connector comprising a female insulative body formed with a cavity, a male insulative body shaped to mate with the cavity of said female body, rows of electrical contacts mounted on said bodies at positions at which they slide resiliently against one another during mating, a plug socket formed in one of said bodies, pockets formed in said one body and extending along one side of said socket, electrical contact clips mounted in said pockets of said one body, a portion of each clip being laterally resiliently displaceable in said pocket and providing on one side one of said electrical contacts, a resiliently yieldable contact spring provided by said displaceable clip portion on the opposite side to said electrical contact and protruding into said socket at a position at which it engages one of said plug tracks when said plug is mated with said socket, said electrical contact and said contact spring of each displaceable portion projecting simultaneously from said body and into said socket, respectively, and said clip portion being resiliently displaceable away from said socket during insertion of said plug and back towards said socket during mating of said two bodies.

5. An electrical connector as set forth in claim 4, in which said male body is a snug fit in the cavity of said female body and has means co-operating with means at opposite end portions of said linear plug to hold said plug rigidly in said socket of said male body.

6. A connector as set forth in claim 5, in which said clips each comprise two metal strips welded in facing relationship to one another at opposite end portions of said clip and bowed away from one another between said end portions to provide a biconvex intermediate portion protruding simultaneously into said socket and from said body, said clip being held against longitudinal movement in one direction by abutment of shoulders of said clip with abutment surfaces of said body, and against longitudinal movement in the opposite direction by abutment of an end edge of a finger sprung out of the other end portion of said clip.

7. A connector as set forth in claim 6, in which the body having said socket is provided with two rows of identical clips lining respective sides of said socket, the other body having said cavity provided with two rows of electrical contact members providing electrical contacts and electrical connection terminals extending from said connector.

8. A connector as set forth in claim in 7, in which said contact members are non-yielding and said clips are made of resiliently yieldable metal.

9. An electrical edge connector comprising a female insulative body having a parallelepiped cavity, two rows of metal members spaced lengthwise of said body and passing through respective apertures in said body, electrical contacts provided by said members and extending parallel to one another at opposite sides of said cavity, hooked ends of said members engaging in recesses in said body and preventing movement of said members in one direction, terminals extending from said body and provided by opposite ends of said members, root portions of said terminals having twists formed therein preventing movement of said members in the opposite direction to that prevented by said hooked ends of said members, a male insulative member shaped to fit snugly in said cavity of said female member, a linear slot shaped socket extending symmetrically into said male member, windows formed in walls of said male member between which said socket is defined, contact clips mounted individually in said walls in two lines disposed, respectively, on opposite sides of said socket, an intermediate portion of each contact clip being laterally resiliently movable in said window away from said socket, strip portions forming said intermediate clip portions being biconvexly arranged to provide contact springs protruding into said socket and electrical contacts protruding from said walls, opposite end portions of said clip having anchorage means co-operating with said male body to limit longitudinal movement of said clips in said walls, longitudinally extending end-parts of said clip protruding from said walls on opposite sides of the entry to said socket, and means formed in said clip end-parts for connecting jumper leads thereto.

10. An edge connector as set forth in claim 9, including bevelled corners on said male body on the side opposite said socket, and said biconvex clip portion meeting one of said clip end portions at a point spaced inwardly from one wall of said window.

References Cited

UNITED STATES PATENTS

| | | | |
|---|---|---|---|
| 3,188,601 | 6/1965 | De Tar. | |
| 3,329,926 | 7/1967 | Aksu et al. | |
| 3,366,916 | 1/1968 | Oktay | 339—74 |

FOREIGN PATENTS

| | | |
|---|---|---|
| 885,040 | 12/1961 | Great Britain. |

MARVIN A. CHAMPION, Primary Examiner
L. J. STAAB, Assistant Examiner

U.S. Cl. X.R.

339—17, 75, 217